United States Patent [19]

Schmidt

[11] 4,111,439
[45] Sep. 5, 1978

[54] ROTARY SEAL

[75] Inventor: John Kenneth Schmidt, Victorville, Calif.

[73] Assignee: Amcord, Inc., Riverside, Calif.

[21] Appl. No.: 804,151

[22] Filed: Jun. 6, 1977

[51] Int. Cl.² .......................... F16J 15/32; F27B 7/24
[52] U.S. Cl. ............................... 277/153; 277/DIG. 4; 277/157; 277/165; 277/DIG. 6; 432/115
[58] Field of Search ............... 277/152, 153, 157, 165, 277/142, DIG. 4, DIG. 6, 84; 432/115

[56] References Cited

U.S. PATENT DOCUMENTS

| 1,550,591 | 8/1925 | Stone | 432/115 |
| 2,124,108 | 7/1938 | Grece | 277/237 A X |
| 2,253,098 | 8/1941 | Schneider | 432/115 X |
| 2,515,629 | 7/1950 | Chambers | 277/157 X |
| 2,522,993 | 9/1950 | Coffey | 277/142 |
| 2,826,403 | 3/1958 | Moklebust | 432/115 |
| 2,930,643 | 3/1960 | Mastrobattista et al. | 277/153 |
| 3,193,266 | 7/1965 | Becker | 432/115 X |
| 3,532,330 | 10/1970 | Swanson | 432/115 X |
| 3,698,727 | 10/1972 | Greenwald | 277/153 |
| 3,940,239 | 2/1976 | Rossi et al. | 432/115 |

FOREIGN PATENT DOCUMENTS 69,128  6/1893  Fed. Rep. of Germany ........... 277/153
379,967 9/1932  United Kingdom ..................... 277/153

OTHER PUBLICATIONS

"Rotary Kiln Seals . . . ," Sam Webb, Reprint From *Pit & Quarry*, Issue of Aug. 1975, pp. 2.

Primary Examiner—Robert S. Ward, Jr.
Attorney, Agent, or Firm—Fitch, Even, Tabin & Luedeka

[57] ABSTRACT

A rotary seal seals a large, high temperature rotary drum, such as a rotary cement kiln, from the inflow of ambient air where the drum is mounted for rotation in respect to a stationary hood, the drum having a substantially circularly cylindrical surface at one open end thereof substantially coaxial with the axis of rotation of the drum, and the hood having an opening through which the cylindrical surface extends. The seal is made of a strip of flexible material for encircling the cylindrical surface, the flexible material being substantially air impermeable and resistant to heat and oxidation at temperatures at least up to 250° F. The outer edge of the strip is sealed to the hood. A wear resistant liner is affixed to the underside of the inner edge of the strip to space the strip from the cylindrical surface. The side of the liner opposite the strip mates with the cylindrical surface and is biased thereagainst.

10 Claims, 7 Drawing Figures

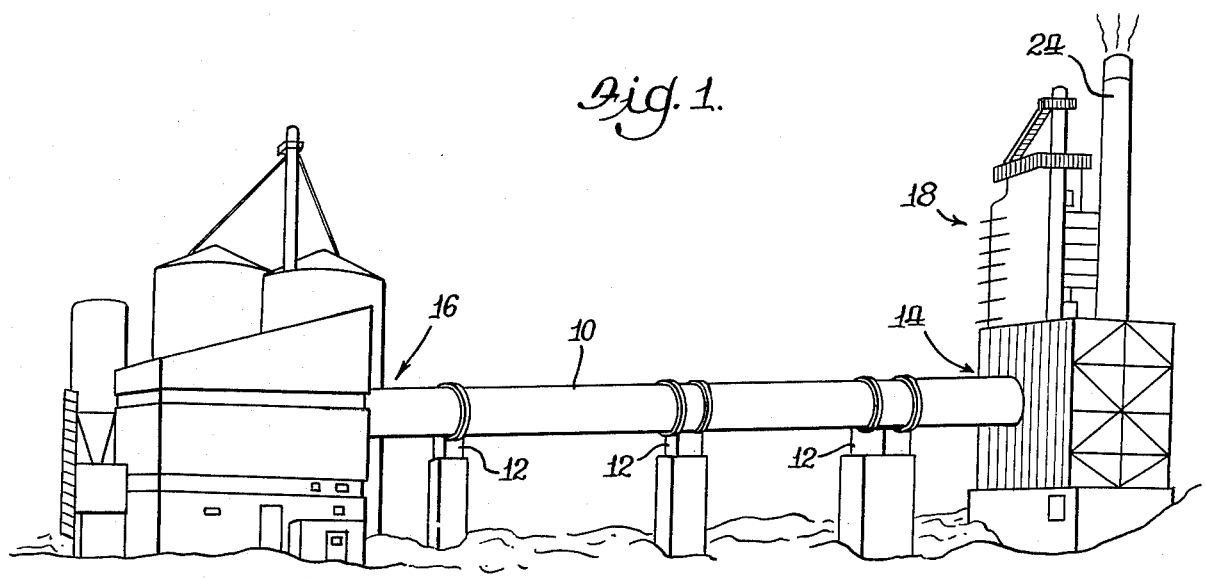
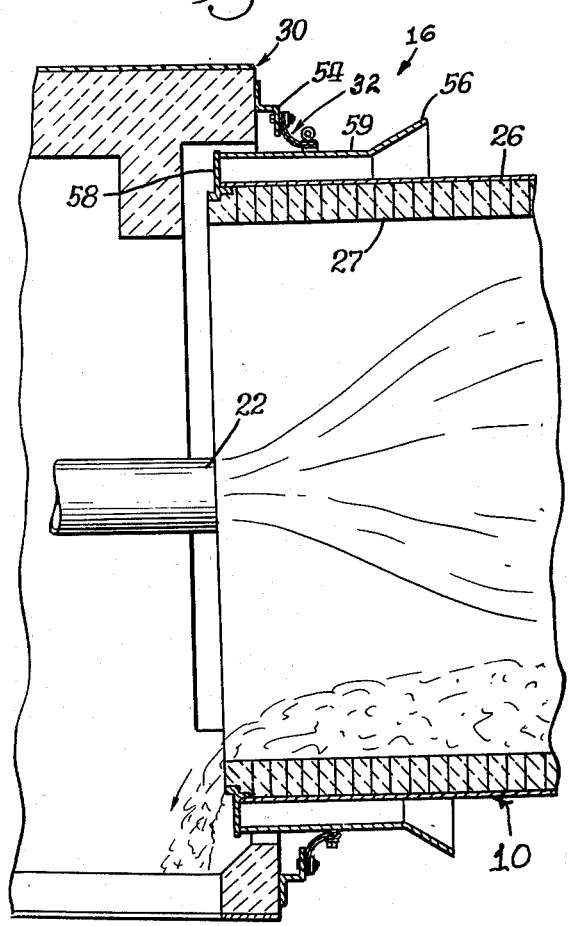
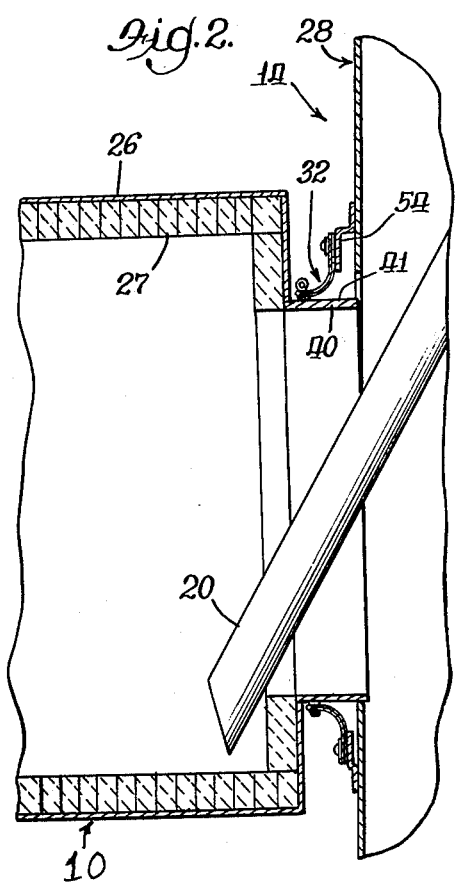

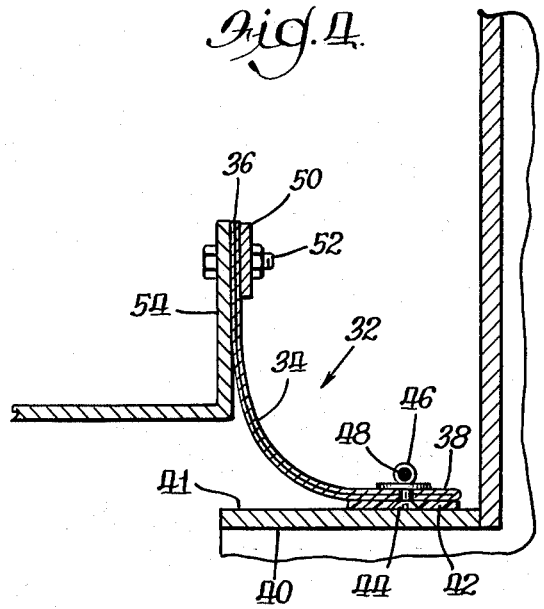
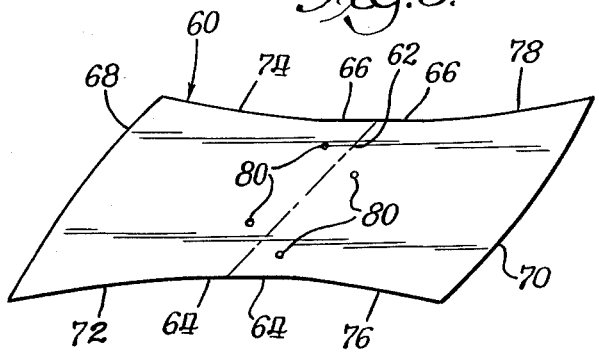
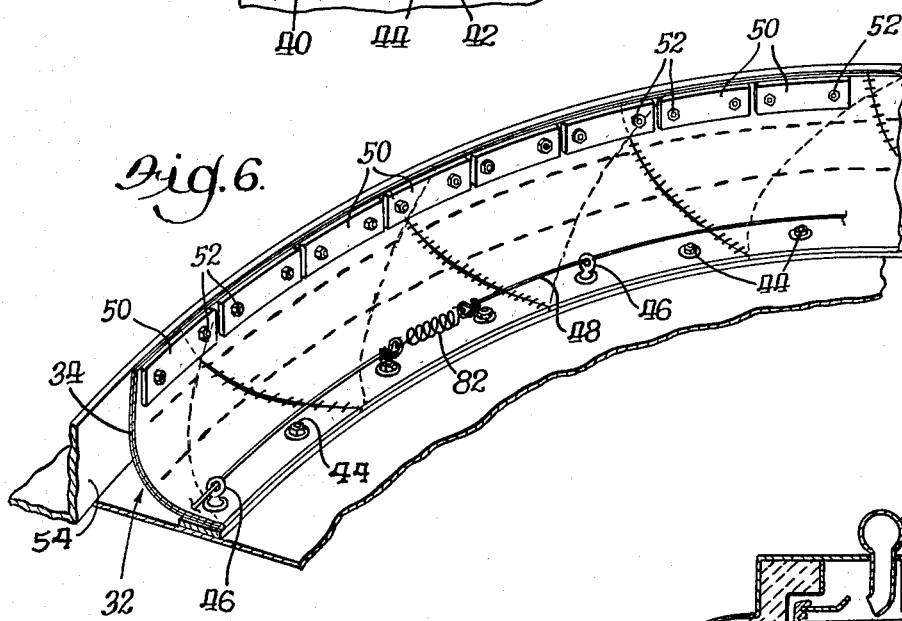
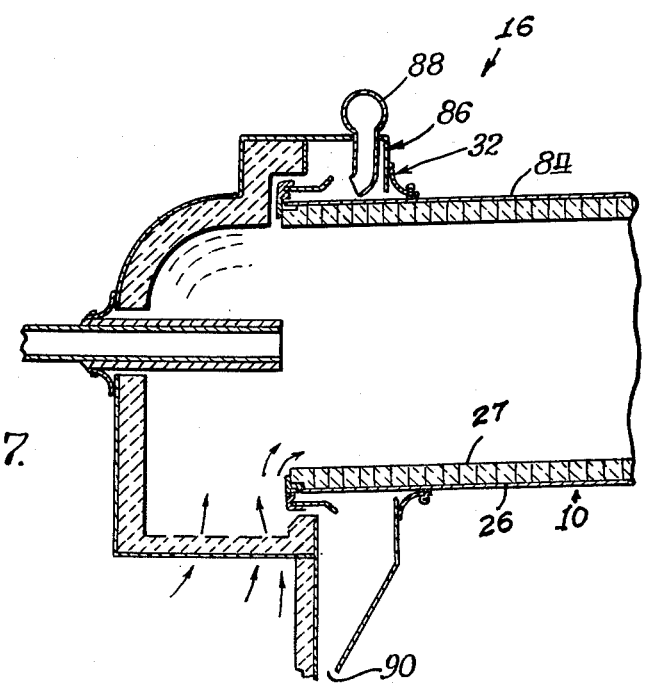

ROTARY SEAL

This application relates to a rotary seal for a large, high-temperature rotary drum, such as a rotary kiln, and more particularly to a flexible seal for sealing the opening between a rotating drum and a stationary hood against the inflow of ambient air.

Kilns for making cement are typically very large and very hot. Such kilns are often more than ten feet in diameter and several hundred feet long. The operating temperature is about 2700°–2950° F. Cement kilns are mounted for rotation with the infeed at one end and the discharge at the other, with both ends closed by hoods.

Partly for the sake of the environment, but mostly to avoid loss of expensive heat, it is desirable that the environment within the kiln be isolated, and to this end the spaces between the kiln and the hoods are sealed. Because of the very high temperatures and very large sizes, the more usual types of seals are not possible. For example, where the internal temperature excursions are more than 2700° F. and the length of the kiln is several hundred feet, longitudinal thermal expansion may be of the order of a foot. Some provision must be made for such longitudinal motion. Conventional flexible seals for accommodating such motion, such as rubber seals, are not possible at the high temperatures. It has been common to provide seals where rigid parts slide along the surface of the kiln to accommodate thermal expansion. Such seals have been mounted in a manner allowing for wobble in the kiln, as may be occasioned by eccentricity. However, a difficulty with such seals has been that rigid mechanical parts from time to time hang up on the kiln, whereupon the great inertia of the kiln breaks the seals to pieces.

An improved kiln seal is disclosed in Webb, "Rotary Kiln Seals," Pit & Quarry, August 1975. The Webb kiln seal was formed by a plurality of flaps of woven asbestos coated with a low friction material, such as a fluorocarbon resin sold by DuPont under the trademark Teflon. While the Webb seals offer many advantages, the multiplicity of separate flaps provide substantial permeability to the seal, resulting in substantial leakage of air, with the consequent leakage of heat, and thus a waste of costly fuel. Further, the separate flaps permitted some of the hot product to fall out of the end of the kiln through the seal. Still further, the life of the seal was relatively short and the melting point of the fluorocarbon coating limited the use of the seal. Still further, the individual flaps were sometimes sucked into the sealed volume by pressure differential, causing the seal to become ineffective.

In accordance with the present invention, a strip of flexible material is used to seal the space between a large high-temperature rotary drum and an adjacent hood, where the drum has a substantially circularly cylindrical surface substantially coaxial with the axis of rotation of the drum, and the hood has a substantially circular opening adjacent that cylindrical surface, the opening being substantially perpendicular to the axis of rotation with the center of the opening lying substantially on the axis. The strip has an inner edge and an outer edge and is made of material that is substantially air impermeable and resistant to heat and oxidation, at least up to 250° F., and preferably up to 800° F. The outer edge is sealed around the hood opening. A wear liner is affixed to the underside of the inner edge of the strip for spacing the strip from the cylindrical surface of the kiln. The friction liner is resistant to heat and oxidation at temperatures resulting from the frictional engagement of the wear liner and the surface. Biasing means urges the friction liner against the cylindrical surface.

Therefore, a primary object of the present invention is to provide a rotary seal for large, high-temperature rotary drums, such as rotary kilns, and more particularly to provide such seal as will more effectively prevent air leakage and is long-lived.

Other objects and advantages of the present invention will become apparent from consideration of the following detailed description, particularly when taken in conjunction with the accompanying drawings in which:

FIG. 1 is a generalized and somewhat stylized drawing of a cement plant including a rotary cement kiln in which the present invention finds particular utility;

FIG. 2 is a vertical sectional view of a typical feed end of a rotary cement kiln as illustrated in FIG. 1 and showing the rotary seal of the present invention;

FIG. 3 is a vertical sectional view of a typical discharge end of a rotary cement kiln as illustrated in FIG. 1, also showing the rotary seal of the present invention;

FIG. 4 is an enlarged vertical sectional view of the seal portion of the structure shown in FIG. 2;

FIG. 5 is a plan view of a typical piece of fabric utilized in forming the seal illustrated in FIG. 4;

FIG. 6 is an isometric view of part of the discharge end of a rotary kiln as shown in FIG. 3, with the seal of the present invention mounted in place; and FIG. 7 is a vertical sectional view of an alternative typical discharge end of a rotary cement kiln as illustrated in FIG. 1, showing an alternative placement of the rotary seal of the present invention.

The rotary seal of the present invention was designed for sealing very large rotary drums experiencing very large heat excursions and in particular was designed for use with rotary cement kilns such as that illustrated generally in FIG. 1. Portland cement is made by heating certain minerals, primarily limestone, in a rotary kiln. As shown in FIG. 1, a drum 10 in the form of a rotary kiln is rotatably mounted on driving supports 12. The kiln is mounted with an axis of rotation at an angle to the horizontal extending from an elevated feed end 14 to a lower discharge end 16. At the feed end, the raw materials are fed from hoppers 18 through a chute 20 (FIG. 2). As the kiln 10 is rotated, the materials fall by gravity toward the discharge end. At the discharge end 16, fuel is introduced through a burner 22 (FIG. 3) which is located at the axis of rotation of the kiln 10. The fuel is burned to create high temperatures in the kiln 10, typically 2750°–3000° F. The raw minerals are thereby burned to produce the cement clinker which falls from the kiln by gravity and is discharged into a heat recuperator through which air is drawn into the kiln 10 for combustion. The passage of air through the heated product recovers heat from the product to produce higher temperature within the kiln 10, hence saving fuel. The kiln is thus a countercurrent furnace with the solids moving from top to bottom and the exhaust gases moving from bottom to top, where they go up a stack 24.

The outside of the kiln 10 is formed of a kiln shell 26 made of steel. To protect the kiln shell from the high temperatures of the manufacturing process, the shell is lined with a refractory lining 27. The kiln shell, therefore, normally does not rise above about 500° F. at the discharge end 16. Of course, it is cooler at the feed end 14.

Partly for environmental reasons, but more importantly for efficiency and economy, the feed end 14 and the discharge end 16 of the kiln 10 are surrounded by adjacent hoods 28 and 30, respectively. To improve the effectiveness of the hoods, the openings between the kiln ends and the hoods are sealed with the rotary seals 32 of the present invention. The hood 28 at the feed end is often called a dust chamber, as it is part of the dust collecting system whereby dust particles from the processing are removed from the combustion gases before discharging the gases into the atmosphere. The hood 30 at the discharge end is often called a firing hood, as the burner is located therein.

As shown in greater detail in FIG. 4, the seal 32 is in the form of a strip of material 34 having an outer edge 36 and an inner edge 38. The strip encircles the kiln 10. As shown in FIG. 4, which illustrates the feed end 14, the kiln terminates in a kiln neck 40 which is a circularly cylindrical member having an outer circularly cylindrical surface 41 substantially concentric with the axis of rotation of the kiln 10. A wear liner 42 is disposed between the inner edge 38 of the strip 34 and the kiln neck 40 to provide a wear surface and to protect the strip 34. The wear liner 42 is fastened to the undersurface of the inner edge 38 by conventional means, such as bolting with bolts 44. Some of the bolts provide eyes 46 through which a cable 48 is strung for holding the inner edge 38 of the strip 34 against the cylindrical surface 41 to preclude leakage of air. The outer edge 36 of the strip 34 is clamped by a segmented clamping ring 50 to a vertical member 54 of the hood 28. The clamping ring 50 may be secured by bolts 52. The vertical member 54 provides a circular opening with its center at the axis of rotation of the kiln 10, thus providing a circular opening surrounding the cylindrical surface 41 of the kiln neck 40.

A similar seal 32 is utilized at the discharge end 16 of the rotary kiln 10. However, because the discharge end is substantially hotter than the feed end 14, an air cooled cowl 56 may be interposed between the seal and the kiln shell 26 as shown in FIG. 3. The cowl 56 is fastened to a nose ring 58 which acts to hold the bricks of the refractory lining 27 in place and is made of heat resistive alloys suitable for very high temperatures. The cowl is supported a few inches from the kiln shell 26 and provides space for the circulation of air around the cowl 56 as by gravity or by using a blower, so that the cowl 56 and the nose ring 58 are kept relatively cool by the circulating air. The cowl 56 may be kept to a temperature of between about 200° to 400° F. In this sealing arrangement, a circularly cylindrical surface 59 is provided by the cowl 56, the surface being coaxial with the axis of rotation of the kiln 10.

As mentioned above, the particular problem the present invention is designed to meet is the problem of sealing very large rotary members operating over large heat excursions. Rigid members used to make sliding seals or labyrinthine seals between the kiln ends and the respective hoods have not been entirely effective and have frequently suffered from the disability of being broken when the rigid part became caught on the rotating kiln surface and were carried to destruction. The seals disclosed by Webb in Pit & Quarry were a substantial improvement in many instances, but suffered from substantial air leakage and the possibility of the individual flaps being sucked into the hoods. On occasion, product fell through the seals.

In accordance with the present invention, a strip 34 completely encircles each respective kiln surface 41 or 59 with no spaces between individual elements of the seal 32. Further, the size and curvature of the seal 32 allow for the seal to remain seated against the surface 41 or 59 even with substantial wobble or eccentricity or out-of-roundness in the rotating kiln 10.

As the seal 32 is to operate at very high temperatures, it is not possible to use the normal seal materials used at lower temperatures, such as rubber and certain other elastomers. Rather, the present seal is preferably made of woven fabric, most particularly made primarily of asbestos, preferably reinforced with brass which stiffens the strip 34. A particular fabric found suitable is known as wire-inserted woven asbestos fabric AAA grade. Fabric one-eighth inch thick has been found suitable. The fabric is coated with a coating that serves to make the fabric substantially air impermeable and to retain asbestos fibers against release into the air. Such fabric is sold by Sepco Corp., Pelham, Ala.

The wear liner 42 is made of heat resistant material, more particularly of conventional brake lining material as used in automobile brakes. This material must be resistant to the temperatures of the cylindrical surface against which it rubs, and more particularly to the temperature as increased by the rubbing friction. The brake lining material preferably used is made of asbestos and metallic fibers molded in a suitable matrix. Material found suitable is sold as friction liner style 232 by Scan-Pac Co., Mequon, Wis. The liner is not so hard as the kiln surface 41 or 59 so as to wear the liner in preferance to the kiln surface. The metallic fibers are for conducting heat. It has been found suitable for large kiln seals to use strips of liner material $\frac{1}{4} \times 3$ inches. The wear liner is relatively stiff, but is sufficiently flexible as to conform to the relatively large cylindrical surface on which it rides. The liner may be lubricated, as with powdered graphite, to reduce the coefficient of friction and, hence, heat and wear.

The seal 32 is preferably made of a plurality of discrete pieces 60 of woven asbestos fabric of a particular shape as will provide the resulting strip 32 with dimensions as will cause the inner edge of the strip to lie relatively snugly against the cylindrical surface 41 or 59 of the kiln 10 and at the same time curve appropriately to lie flat against the vertical member 54 of the respective hood. A suitable shape for a particular installation is illustrated in FIG. 5. Each piece 60 is formed of two identical halves with a fold line 62 therebetween lying along the bias of the woven fabric of which the piece 60 is made. The two lateral edges of the piece extend parallel to one another over portions 64 and 66. These are in the region of the piece where the wear liner 42 is fastened to ride on the cylindrical surface 41 or 59 of the respective end of the kiln 10. The ends 68 and 70 of the pieces 60 are cut on particular radii so that when the pieces are assembled to form a seal 32, the ends 68 and 70 lie along the outer edge of the clamping member 50. From the parallel portions 64 and 66 to the respective ends 68 and 70, the edges of the pieces 60 are curved or made of a plurality of straight sections, as shown at 72, 74, 76 and 78.

To assemble the individual pieces to form a strip, edge portions 72, 64 and 76 of one strip are abutted against edge portions 74, 66 and 78 of the adjacent strip. This requires some deformation or puckering of the strip, as is permitted because the material is relatively flexible. When the pieces have been abutted, they are fastened together without spaces therebetween, as by stapling. Bolt holes 80 are fashioned at appropriate places in the fabric. The strip 34 is made somewhat longer than necessary to encircle the respective cylindrical surface 41 or 59. Then the strip is folded along the fold line so that the seam on one side of the fold is covered by woven material on the other side of the fold. This assures that there is no direct leakage path through the fabric, even through the seams are imperfect. The butt seams assure that there is no leakage at the edges of the strip 34. The wear liner 42 is then bolted to the underside of the inner edge 38 of the strip 34, and the strip is assembled on the respective end of the kiln and cut to size. The two ends of the strip 34 are then fastened together, as by stapling, riveting or bolting to form an endless strip. To complete the seal 32, the outer edge 36 of the seal 32 is then clamped to the vertical member 54 of the respective hood, and the cable 48 is fed through the respective eyes 46. 3/16 inch stranded stainless steel cable has been found suitable. A spring 82 is fastened between the ends of the cable 48 to apply appropriate tension to the cable as to bias the strip 34 and the intervening wear liner 42 against the respective cylindrical surface 41 or 59. 150 lb. tension has been found suitable for a 10 foot seal. This assures a positive seal, particularly on the underside of the kiln 10 where gravity would otherwise draw the strip 34 away from the respective cylindrical surface 41 or 59.

Various modifications may be made in the seal 34 without departing from the scope of the present invention. For example, other materials having the described properties may be used. Other forms of the spring 82 may be used, or some other biasing means, such as a weight on a cable wrapped around the strip 34. Further, as biasing is most needed on the underside of the cylindrical surface 41 or 59, it is possible in some installations to urge only the part of the strip 34 lying beneath the kiln against the respective surface 41 or 59, with the part above the kiln being sealed by the force of gravity.

The seal 32 may be mounted in alternative positions and by alternative means. In FIG. 7 is illustrated an alternative mounting where the seal 32 seals directly to the kiln shell 26 itself, the kiln shell 26 providing a cylindrical surface 84 against which the wear liner 42 is urged. In this embodiment, a hood extension 86 extends over the cowl 56. Cooling air is introduced through a duct 88, circulated around the cowl 56 and the hood extension 86, and passed out an outlet 90. The air is heated in cooling the cowl 56 and other structure within the hood extension 86, and the thus heated air is then used as part of the air introduced through the heat recuperator. In this embodiment, the hood extension 86 shields the seal 32 from direct radiation from the inside walls of the hood 30. This protects the seal material from such a hostile environment, extending seal life.

The rotary seal 32 of the present invention also may be used in other industries. Other places where the seal finds utility include lime kilns for calcining limestone, regenerators of sludge in the paper industry, kilns for making refractory materials or lightweight aggregates, scrubbers for removing sulfur dioxide and particulate matter from boiler gases, and dryers of aggregate for bituminous concrete.

As stated above, the rotary seal 32 of the present invention is designed to limit the inflow of ambient air into the drum 10. In cement plants, a discharge fan produces a pressure within the kiln 10 of 6 to 10 in. $H_2O$ below atmospheric pressure. The fan draws combustion gases through the kiln 10 and pushes them through a dust collector. The dust collector is often a multi-million dollar system that removes the dust from the air so that the air leaving the stack 24 meets environmental standards. Any air leaking into the cement processing gases other than that provided for the processing itself, merely dilutes the combustion products and makes removal of the contaminants more difficult. The use of the seals of the present invention thus facilitates the cleaning of the combustion gases by the dust collector, and makes it easier for dust collectors to meet the current environmental standards required by law. This is particularly helpful where the dust collector already installed was designed for earlier, less stringent, environmental standards.

At the hot end of the kiln, reduction of leakage of ambient air into the kiln is a direct savings in thermal energy required for the process. The making of cement requires a certain threshold temperature. Where cool air is permitted to leak in, the temperature in the kiln is reduced. This requires the burning of additional fuel to keep the kiln temperature at the desired point.

What is claimed is:

1. A rotary seal for sealing a large, high temperature rotary drum from the inflow of ambient air where the drum is mounted for rotation in respect to at least one stationary hood, said drum having a substantially circularly cylindrical surface at one open end thereof substantially coaxial with the axis of rotation of said drum, and said hood having an opening through which said cylindrical surface extends, and said hood being open to the interior of said drum through said open end, said seal comprising a strip of flexible material for encircling said cylindrical surface and having an inner edge and an outer edge, said flexible material being formed of cloth and substantially air impermeable and resistant to heat and oxidation at temperatures at least up to 250° F., means for sealing said outer edge to said hood around said opening, a wear liner affixed to the underside of said inner edge for spacing said strip from said cylindrical surface, said wear liner having an undersurface on a side opposite said strip for mating with said cylindrical surface, said wear liner being resistant to wear, heat and oxidation at temperatures resulting from the frictional engagement of said undersurface and said cylindrical surface, and biasing means for biasing said undersurface against said cylindrical surface.

2. A rotary seal according to claim 1 wherein said strip is formed of discrete pieces of woven fabric fastened together to form an endless strip.

3. A rotary seal according to claim 2 wherein adjacent ones of said pieces are fastened together at butt seams.

4. A rotary seal according to claim 1 wherein said cloth comprises woven asbestos, fabric including metal wire reinforcement and a binder material holding the asbestos fibers in place and making the fabric substantially air impermeable.

5. A rotary seal according to claim 4 wherein said wear liner is made of asbestos and metal particles embedded in a matrix.

6. A rotary seal for sealing a large, high temperature rotary drum from the inflow of ambient air where the drum is mounted for rotation in respect to at least one stationary hood, said drum having a substantially circularly cylindrical surface at one open end thereof substantially coaxial with the axis of rotation of said drum, said hood having an opening through which said cylindrical surface extends, and said hood being open to the interior of said drum through said open end, said seal comprising a strip of flexible material for encircling said cylindrical surface and having an inner edge and an outer edge, said flexible material being substantially air impermeable and resistant to heat and oxidation at temperatures at least up to 250° F., said strip being formed of discrete pieces of woven fabric fastened together at seams to form an endless strip, with each of said pieces being folded along a fold line forming the inner edge of said strip, and with the portions of each seam on opposite sides of the fold line being displaced from one another so that each portion of the seam lies opposite uncut woven fabric on the other side of the fold line, means for sealing said outer edge to said hood around said opening, a wear liner affixed to the underside of said inner edge for spacing said strip from said cylindrical surface, said wear liner having an undersurface on a side opposite said strip for mating with said cylindrical surface, said wear liner being resistant to wear, heat and oxidation at temperatures resulting from the frictional engagement of said undersurface and said cylindrical surface, and biasing means for biasing said undersurface against said cylindrical surface.

7. A rotary seal according to claim 6 wherein said fold line lies substantially along the bias of said fabric.

8. A rotary seal for sealing a large, high temperature rotary drum from the inflow of ambient air where the drum is mounted for rotation in respect to at least one stationary hood, said drum having a substantially circularly cylindrical surface at one open end thereof substantially coaxial with the axis of rotation of said drum, and said hood having an opening through which said cylindrical surface extends, and said hood being open to the interior of said drum through said open end, said seal comprising a strip of flexible material for encircling said cylindrical surface and having an inner edge and an outer edge, said flexible material being substantially air impermeable and resistant to heat and oxidation at temperatures at least up to 250° F., said strip being formed of discrete pieces of woven fabric fastened together at seams to form an endless strip having at least two layers, with the seams of respective layers being displaced from one another so that each seam of one layer lies opposite uncut woven fabric of another layer, means for sealing said outer edge to said hood around said opening, a wear liner affixed to the underside of said inner edge for spacing said strip from said cylindrical surface, said wear liner having an undersurface on a side opposite said strip for mating with said cylindrical surface, said wear liner being resistant to wear, heat and oxidation at temperatures resulting from the frictional engagement of said undersurface and said cylindrical surface, and biasing means for biasing said undersurface against said cylindrical surface.

9. A rotary seal for sealing a large, high temperature rotary drum from the inflow of ambient air where the drum is mounted for rotation in respect to at least one stationary hood, said drum having a substantially circularly cylindrical surface at one open end thereof substantially coaxial with the axis of rotation of said drum, and said hood having an opening through which said cylindrical surface extends, and said hood being open to the interior of said drum through said open end, said seal comprising a strip of flexible material for encircling said cylindrical surface and having an inner edge and an outer edge, said flexible material being substantially air impermeable and resistant to heat and oxidation at temperatures at least up to 250° F., means for sealing said outer edge to said hood around said opening, a wear liner affixed to the underside of said inner edge for spacing said strip from said cylindrical surface, said wear liner having an undersurface on a side opposite said strip for mating with said cylindrical surface, said wear liner being resistant to wear, heat and oxidation at temperatures resulting from the frictional engagement of said undersurface and said cylindrical surface, and biasing means for biasing said undersurface against said cylindrical surface, including a spring biased cable encircling said strip adjacent said inner edge and extending through eyes affixed to said wear liner.

10. A rotary seal for sealing a large, high temperature rotary drum from the inflow of ambient air where the drum is mounted for rotation in respect to at least one stationary hood, said drum having a substantially circularly cylindrical surface at one open end thereof substantially coaxial with the axis of rotation of said drum, and said hood having an opening through which said cylindrical surface extends, and said hood being open to the interior of said drum through said open end, said seal comprising a strip of flexible material for encircling said cylindrical surface and having an inner edge and an outer edge, said flexible material being substantially air impermeable and resistant to heat and oxidation at temperatures at least up to 250° F., means for sealing said outer edge to said hood around said opening, a wear liner affixed to the underside of said inner edge for spacing said strip from said cylindrical surface, said wear liner having an undersurface on a side opposite said strip for mating with said cylindrical surface, said wear liner being resistant to wear, heat and oxidation at temperatures resulting from the frictional engagement of said undersurface and said cylindrical surface, and biasing means for biasing said undersurface against said cylindrical surface, including a cable extending through eyes affixed to said wear liner, said cable being disposed on the side of said strip opposite said wear liner and extending at least over the part of said strip beneath said cylindrical surface for biasing at least that part of said strip and the respective part of said wear liner toward said cylindrical surface.

* * * * *

UNITED STATES PATENT OFFICE
CERTIFICATE OF CORRECTION

Patent No. 4,111,439      Dated September 5, 1978

Inventor(s) John Kenneth Schmidt

It is certified that error appears in the above-identified patent and that said Letters Patent are hereby corrected as shown below:

Column 4, line 13, "brass which" should be

--brass wire which--.

Column 5, line 9, "through" should be --though--.

Signed and Sealed this

First Day of May 1979

[SEAL]

Attest:

RUTH C. MASON
Attesting Officer

DONALD W. BANNER
Commissioner of Patents and Trademarks